US006571213B1

United States Patent
Altendahl et al.

(10) Patent No.: US 6,571,213 B1
(45) Date of Patent: May 27, 2003

(54) ROUTER UTILITY FOR A PARCEL SHIPPING SYSTEM

(75) Inventors: James R. Altendahl, Eagan, MN (US); Steven R. Lent, Burnsville, MN (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 09/475,882

(22) Filed: Dec. 30, 1999

(51) Int. Cl.[7] .............................................. G06F 17/60
(52) U.S. Cl. .............................. 705/1; 705/7; 705/410; 705/408; 235/375; 235/478
(58) Field of Search .............................. 705/1, 34, 402, 705/401, 7; 235/375, 478.01

(56) References Cited

U.S. PATENT DOCUMENTS

| | | | |
|---|---|---|---|
| 5,117,364 A | 5/1992 | Barns-Slavin et al. | 364/464.03 |
| 5,124,926 A | 6/1992 | Barns-Slavin et al. | 364/464.03 |
| 5,222,018 A | 6/1993 | Sharpe et al. | 364/406 |
| 5,481,464 A | 1/1996 | Ramsden | 364/464.03 |
| 5,631,827 A | 5/1997 | Nicholls et al. | 395/228 |
| 5,666,493 A | 9/1997 | Wojcik et al. | 705/26 |
| 5,729,459 A | 3/1998 | Brandien et al. | 364/464.12 |
| 5,869,819 A * | 2/1999 | Knowles et al. | 235/375 |
| 5,923,017 A * | 7/1999 | Bjorner et al. | 235/385 |
| 5,995,950 A | 11/1999 | Barns-Slavin et al. | 705/402 |
| 6,018,725 A | 1/2000 | Boucher et al. | 705/401 |
| 6,036,348 A | 3/2000 | Miura | 364/478.13 |
| 6,041,318 A | 3/2000 | Danford-Klein et al. | 705/400 |
| 6,064,994 A * | 5/2000 | Kubatzki et al. | 235/375 |
| 6,078,889 A | 6/2000 | Boucher et al. | 705/1 |
| 6,230,872 B1 | 5/2001 | Huang et al. | 198/368 |
| 6,233,568 B1 | 5/2001 | Kara | 705/410 |
| 6,286,009 B1 | 9/2001 | Mattioli, Jr. et al. | 707/102 |
| 6,304,856 B1 | 10/2001 | Soga et al. | 705/28 |
| 6,304,857 B1 * | 10/2001 | Heindel et al. | 705/34 |
| 6,321,214 B1 * | 11/2001 | Thiel | 705/408 |
| 6,321,992 B1 * | 11/2001 | Knowles et al. | 1/1 |
| 2002/0087375 A1 * | 7/2002 | Griffin et al. | 705/7 |

FOREIGN PATENT DOCUMENTS

FR    0 333 043 A1 *  9/1989  ........... G06F/15/21

OTHER PUBLICATIONS

Arcelus, F. J., Rowcroft, J.E., Freight rates for small shipments, Jul. 1993, International Journal of Production Economics, vol. 30–31, p. 571–577.*

Stephanie Stahl, Information is part of the package–package delivery companies are using innovative techonolies to provides more information to customers, Information Week, 1996, n 596, p. 206.*

Eric R. Chabrow, Shipment tracking–data is part of the package–UPS and rival offer service to help client track their shipments, Information week, 1995, n 559, pp. 43.*

* cited by examiner

Primary Examiner—James P. Trammell
Assistant Examiner—Firmin Backer
(74) Attorney, Agent, or Firm—Charles R. Malandra, Jr.; Angelo N. Chaclas

(57) ABSTRACT

A router utility and corresponding method for routing a load of one or more shipments of parcels, for use in a system for managing shipping parcels that includes a shipping database and a planning engine that provides load information for the load indicating a load identifier. The router utility includes: an input module for providing the load identifier included in the load information, and an analyzer for providing a carrier and service list. The planning information from the shipping database is organized as a set of tables of field records, including: an address table, for indicating an address and a route identifier based on an address identifier; a shipment header table, for indicating charge terms corresponding to a load identifier and for indicating at least one address identifier; rate shop group tables, for indicating one or more routes (a carrier and service); a route identifier priority table, for indicating priority for determining a route identifier based on charge terms; and routing instruction set tables, for indicating instructions for determining a route identifier or a rate shop group based on a route identifier. The routing instruction set tables can include condition fields which the router evaluates in determining what routing instructions to use. In addition, all records of the rate shop group tables applicable to a shipment are evaluated in combination and set logic can then be used in specifying a group of carriers and services to rate shop.

7 Claims, 7 Drawing Sheets

FIG. 5

| Carrier ID | Service | Penalty | DoNotUse |
|---|---|---|---|
| UPS | GRD | | ☐ |
| RPS | GRD | | ☐ |
| JRA | GRD | 10 | ☐ |
| | | | ☐ |
| | | | ☐ |

RateShopGroup ID: GRDPKG    Description: Ground Package Carriers

FIG. 7

| ChargeTerms | 1st Priority | 2nd Priority | 3rd Priority | 4th Priority |
|---|---|---|---|---|
| PPD | Shipper | Ship-For | Consignee | |
| PPA | Shipper | Ship-For | Consignee | |
| COL | Consignee | Bill-To | Shipper | |
| 3RD | Bill-To | Shipper | Consignee | |

Route ID: KMART    Description: Consignee routing for KMART stores

Remarks

Condition

| LineNr | Label | Rule ID | Units | LowVal | HighVal |
|---|---|---|---|---|---|
| 1 |  | WGT | LBS | 1 | 100 |
| 2 |  | WGT | LBS | 101 | 40000 |
| 3 | PKG | SERV |  | GRD | GRD |
| 4 |  | WGT | LBS | 1 | 100 |
| 5 | LTL | DEST |  | 60601 | 60610 |
| 6 |  | DEST |  | 0 | 99999 |

64

GoTo Label

| GoToLabel |
|---|
| PKG |
| LTL |
|  |
|  |
|  |
|  |

65

Assign Carrier/ Service

| Carrier ID | Service |
|---|---|
|  |  |
|  |  |
| UPS | 1A |
|  |  |
| RDWY | LTL |
|  |  |

66

Assign RateShopGroup

| RateShopGroupID |
|---|
|  |
|  |
| GRDPKG |
|  |
|  |
| LTLLESSRDWY |

ROUTER UTILITY FOR A PARCEL SHIPPING SYSTEM

CROSS REFERENCE TO RELATED APPLICATIONS

The present invention is related to the following U.S. applications; U.S. application, Ser. No. 09/475,880 filed Dec. 30, 1999 entitled, "A PLANNING ENGINE FOR A PARCEL SHIPPING SYSTEM"; U.S. application, Ser. No. 09/476,717 filed Dec. 30, 1999 entitled, "A SYSTEM FOR MANAGING PARCEL SHIPPING"; U.S. application, Ser. No. 09/475,883 filed Dec. 30, 1999 entitled, "A RATER UTILITY FOR A PARCEL SHIPPING SYSTEM"; and U.S. application, Ser. No. 09/475,881 filed Dec. 30, 1999 entitled, "A LOAD PLANNING DATABASE FOR A PARCEL SHIPPING SYSTEM".

All of the applications are assigned to the present assignee and filed on the same date hereof. The subject matter of each of these applications is hereby incorporated by reference.

FIELD OF THE INVENTION

The present invention pertains to the field of software engineering for parcel shipping, and more particularly to planning the shipping of parcels, including performing routing and rating for the shipping of parcels.

BACKGROUND OF THE INVENTION

Companies that provide items such as finished goods or raw materials have a lot of choice in how the items are shipped (in the sense of parcel shipping). If choices are made correctly, the shipper can realize significant savings. The choices, however, are complex enough that having to analyze options for any particular shipping requirement is likely to overwhelm the typical shipping department employee. Although making a choice in how to ship a parcel could be automated for any particular shipper (the sender, not the carrier), the cost of doing so is great enough that most shippers would be reluctant to go ahead with automating the shipping options analysis.

The principal elements of planning the shipping of a parcel or a batch of parcels are first, determining a route for the parcel or each parcel in a batch of parcels (called routing), and second, determining a rate for the parcel or for each parcel in the batch of parcels. In planning for a single parcel, only routing and rating are performed. In planning for shipping a batch of parcels, it is also desirable to examine opportunities to consolidate the parcels, and if some shipments can be consolidated, to prorate the costs of shipping each consolidated parcel (i.e. to apportion the costs of a load of several consolidated shipments of parcels among the individual parcels).

Given an overall system for managing parcel shipping, such as that disclosed in the related application, "SYSTEM FOR MANAGING PARCEL SHIPPING," what is needed is a special-purpose module (utility) for determining possible routes (carrier and service) for shipping a parcel or a consolidation of parcels, considering all business rules or ad hoc shipping instructions (applying only to the shipping of a single parcel), without taking into account the cost of shipping using any particular route, i.e. without undertaking to determine a rate for a route, because that rating of a route is involved enough to merit its being performed by a separate special-purpose module.

Ideally, a routing module would be callable by other modules without its having to be permanently linked to the other modules, in the sense of a software "build."

SUMMARY OF THE INVENTION

Accordingly, the present invention provides a router utility and corresponding method for routing a load of one or more shipments of parcels, for use in a system for managing shipping parcels that includes a shipping database and a planning engine that provides load information for the load indicating a load identifier. The router utility includes: an input module, responsive to the load information, for providing the load identifier included in the load information; and an analyzer, responsive to the load identifier, and further responsive to planning information from the shipping database, for providing a carrier and service list. The planning information from the shipping database is organized as a set of tables of records, each record including one or more fields, and each record using at least one field as an index. The set includes the following tables: an address table, for indicating an address and a route identifier (that indicates a set of routing instructions) based on an address identifier; a shipment header table, for indicating charge terms corresponding to a load identifier, and for indicating at least one address identifier; rate shop group tables, for indicating one or more routes, each route being a carrier and service; a route identifier priority table, for indicating priority for determining a route identifier based on charge terms; and routing instruction set tables, for indicating instructions for determining a route identifier or a rate shop group, based on a route identifier. (A route identifier indicates a particular set of routing instructions, and the records in the routing instruction set tables identify which route identifier to use, or whether instead a particular carrier and service or set of carriers and services are to be used.)

In a further aspect of the invention, the routing instruction set tables include a table of records with the following fields: condition fields, for indicating a condition; a label field, for indicating a label identifying another record in the table; carrier/service fields, for indicating as a routing instruction a carrier, a service, or a carrier and a service; and a rate shop group field, for indicating as a routing instruction a rate shop group identifier. In this aspect of the invention, the router applies a particular routing instruction based on whether one or more conditions corresponding to the routing instruction are true, the correspondence being made either through a label field or by including the routing instruction in a record including one of the one or more conditions.

In a still further aspect of the invention, the rate shop group tables include a rate shop list table having one or more records corresponding to a same rate shop group identifier, and the router interprets all of the records corresponding to the same rate shop group identifier in combination, thereby enabling the use of set logic in indicating a group of carriers and services to rate shop.

BRIEF DESCRIPTION OF THE DRAWINGS

The above and other objects, features and advantages of the invention will become apparent from a consideration of the subsequent detailed description presented in connection with accompanying drawings, in which:

FIG. 5 is an illustration of a data entry screen showing records of rate shop group tables;

FIG. 6 is an illustration of a data entry screen showing records of routing instruction set tables;

FIG. 7 is an illustration of a data entry screen showing all of the records of a route priority table.

BEST MODE FOR CARRYING OUT THE INVENTION

The Overall System for Managing Parcel Shipping

Figure 1:
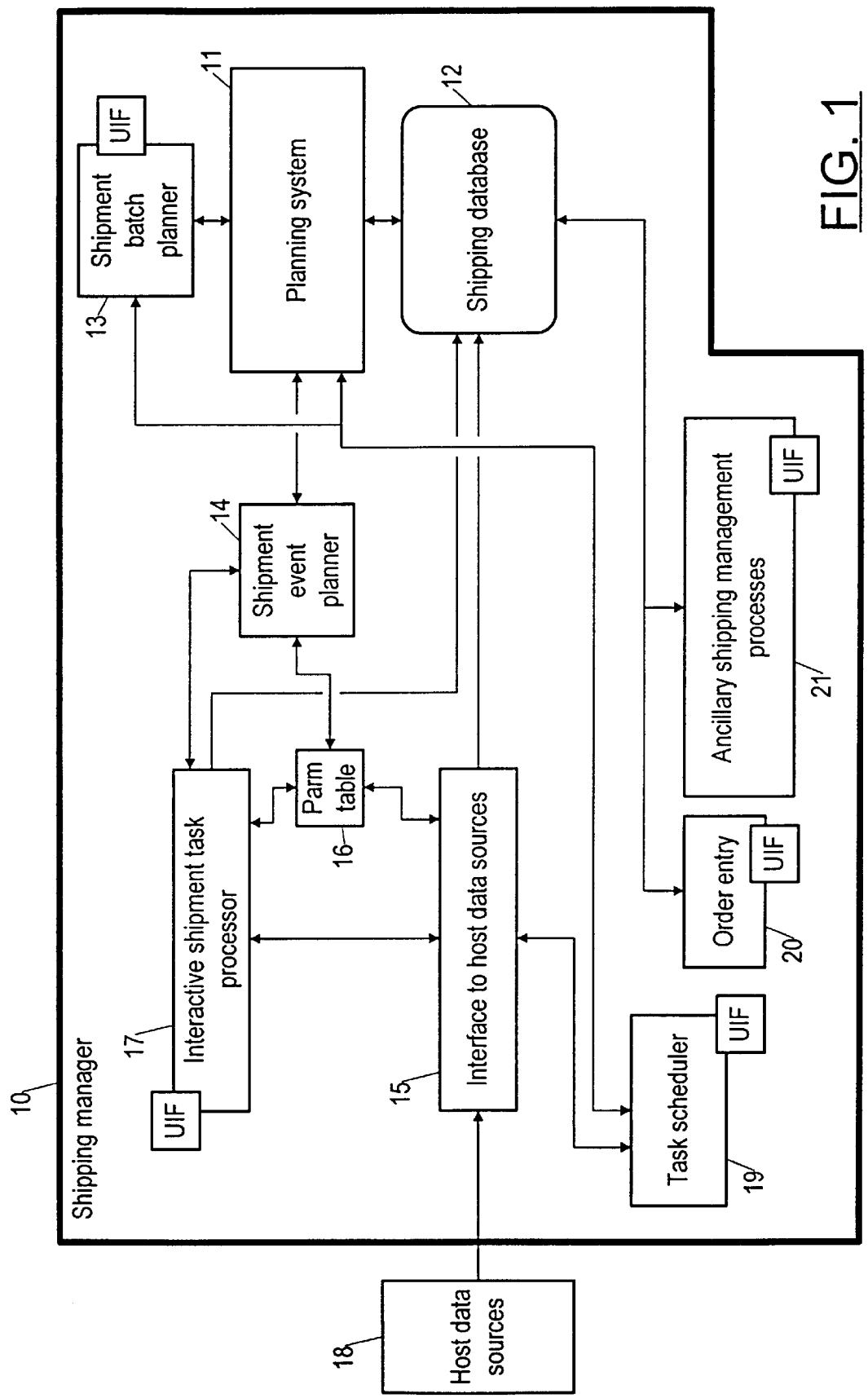
FIG. 1 is a block diagram, with oriented lines indicating the direction of dataflow, of a shipping manager according to the present invention.

Referring now to FIG. 1, a shipping manager 10 according to the present invention is a system for managing all aspects of shipping a parcel, from order entry creating for the shipping manager a requirement to ship the parcel, to picking and packing items to be included in the parcel, to getting the parcel to its destination according to any constraints on its shipment. The shipping manager 10 can be used as a standalone application, preferably executing under Microsoft Corporation's WINDOWS 95 operating system or a more recent similar operating system. It can also be executed on a server attached to a network. Finally, it can be used in concert with other, independent shipping related applications, and when used in this mode, can extract data from host data sources 18 of the independent shipping related applications for integration into its own various data stores.

The invention will now be described, with reference to FIG. 1 and also to FIG. 2, in terms of a scenario in which a user, called here a seller, who is an employee of a direct seller of (personal computer) business systems, has received an order for a business system to be shipped to a customer (consignee), a business. In the scenario, the shipping manager 10 executes in the standalone mode. The seller has agreed to ship the business system according to a prior understanding with the customer business. The agreement is that a business system is to be shipped so as to arrive no later than two weeks from the date of the order for the business system, and otherwise is to be shipped as inexpensively as possible. The business system includes various items, such as a computer according to the consignee's specification, a monitor, and a keyboard and mouse.

Figure 2:
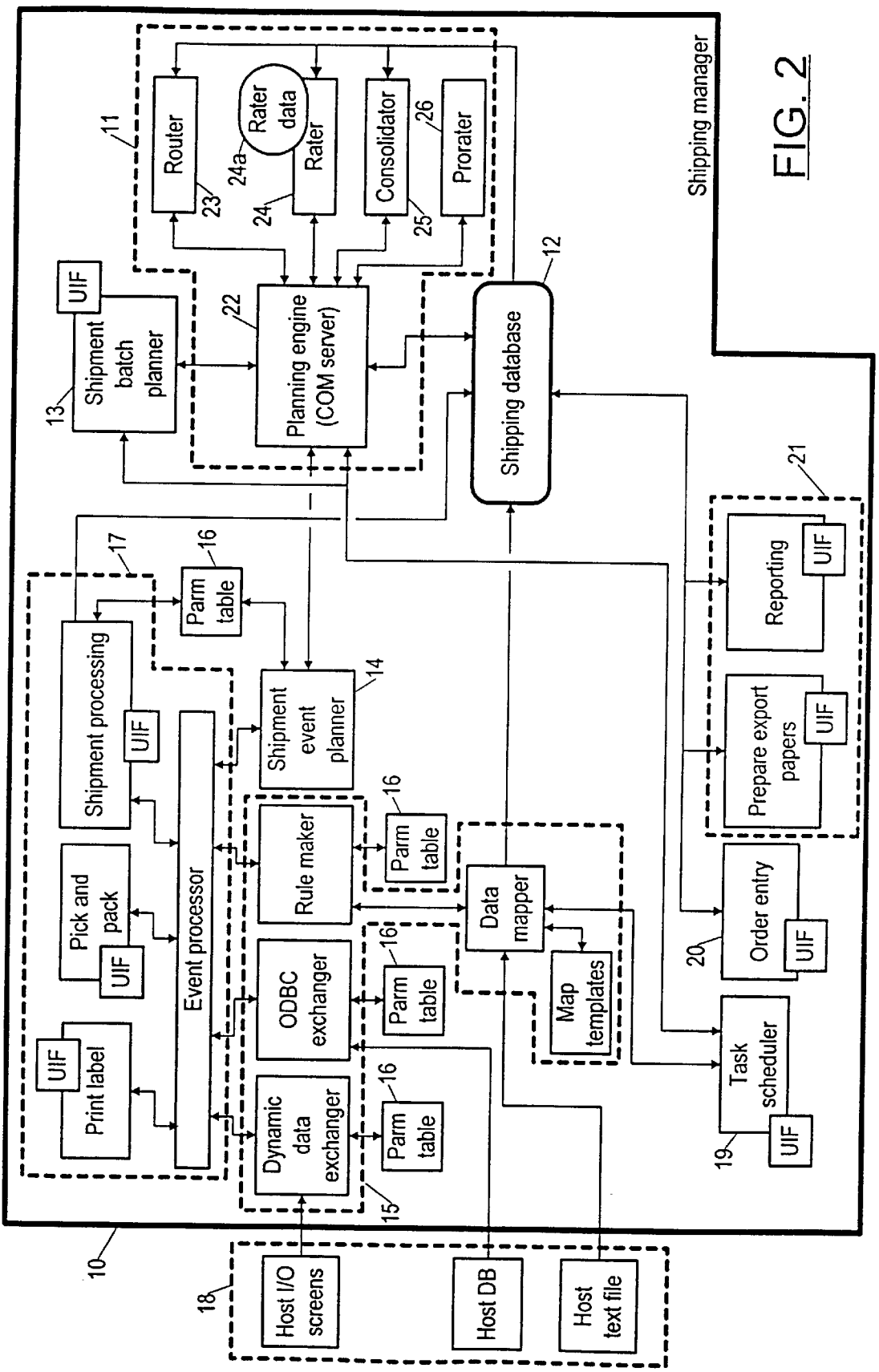
FIG. 2 is another block diagram showing the shipping manager of FIG. 1 in greater detail.

Still referring to FIG. 1 and also to FIG. 2, the seller enters the order through a user interface (UIF) provided with an order entry module 20, which stores the order in a shipping database 12. The order includes, in general, a shipper, a service (ground, overnight, and so on), charge terms, payment terms, ship-to address information, and a recitation of each item ordered. In the present scenario, however, the shipper and service are not specified.

An order can be entered in other ways besides using the order entry module 20. An order can also be entered via electronic data interchange (EDI), for which the system provides an EDI interface (not shown). An order can also be entered by downloading it from a host system file via a data mapper included as part of an interface 15 to host data sources, which is described below.

Next, the seller engages an interactive shipment task processor 17, including a pick and pack module (see FIG. 2), and uses the pick and pack module to pick the items ordered from stock and to place them into shipping resources such as cartons, pallets and containers. The shipping manager keeps track of the contents of each resource and also, conversely, the resource in which each item ordered is packed. It can automatically assign resource numbers or use user-supplied identifiers. In the present scenario, all of the items are packed in a single resource to which the shipping manager 10 automatically assigns a resource number.

With the items picked and packed, the seller engages a shipment processing module (FIG. 2), which is another module of the interactive shipment task processor 17. The shipment processing module enables the user to arrange for shipping the ordered items, now all associated with a single resource in this scenario. In general, though, an order can be packed into several different resources and can then be divided up into several shipments. In the scenario, the resource is an entire shipment, i.e. a shipment is created that contains only the single resource that in turn includes all of the items ordered by the customer.

The first thing to be done in shipment processing is to route the shipment. Essentially, routing consists of identifying what carriers and services could be used to deliver the shipment, given any routing instructions provided by the consignee. Routing instructions are an example of a so-called business rule, and the shipping manager 10 allows using conditional logic ("if then" logic) to express the business rules. For example, a routing instruction (business rule) might be: if a shipment is going to Chicago, then use Alpha Freight Service. The shipping manager 10 allows the simultaneous application of various business rules. So, for example, in addition to the Chicago rule, the shipping manager 10 might apply the following rules: if expected delivery is Saturday, then use Bravo Freight Service; and if a shipment weighs 400 to 1,500 lbs., then use Charlie Freight Service.

The business rules can be stored in the shipping database 12 (each rule being saved using a route ID as an index for retrieving the rule), and can be created through the shipment processing module (FIG. 2) of the interactive shipment task processor 17, or through the shipment batch planner 13. In addition, business rules can be extracted from host data sources 18, via an interface 15 to the host data sources, provided to the interactive shipment task processor 17, and optionally saved to the shipping database 12. It is also possible, using the interactive shipment task processor 17, to have the shipping manager 10 retrieve as needed some or all business rules from the host data sources 18, and in particular from a host text file (FIG. 2) that is part of the host data sources 18.

The system provides for business rules not only for a consignee, but for shippers, third parties, and bill-to-addressees. Business rules can be prioritized based on charge terms of the shipment, typically based on who is paying for the shipping. Other bases for prioritizing are also possible, such as origin of a rule, i.e. whether the rule is a consignee-rule, shipper-rule, third-party-rule, and so on. A route priority table is used determine priority, as discussed below.

In the scenario here, the consignee has as a business rule the agreement noted above, namely that a business system is to be shipped so as to arrive no later than two weeks from the date of the order for the business system, and otherwise is to be shipped as inexpensively as possible. The business rule is stored in the shipping database 12.

In the scenario, then, the shipment is routed by applying the business rules on file (in the shipping database 12) for the consignee. The result of the routing is that various carriers and services are acceptable (because the identified carriers provide the identified services in shipping to the consignee's address), at least according to the business rules on file for the consignee. Specifically, Alpha, Bravo and Delta are all possible choices, using as the service of each either ground or air.

The routing is performed by the planning system 11, invoked by the interactive shipment task processor 17. As shown in FIG. 2, the planning system 11 includes a planning engine 22 that is a component object module (COM) server, as well as various modules that can be called by the planning engine 22: a rater 24, a router 23, a consolidator 25, and a prorater 26. A COM server, such as is available with Microsoft WINDOWS 95 and later versions and also with Microsoft WINDOWS NT, uses a standard interprocess communication protocol to effectively perform a run-time linking of processes that execute as standalone modules. It is used especially for implementing a distributed application enabling component standalone modules to cooperate to accomplish the overall aims of the application. The component processes may even exist on different computers connected through the Internet.

The interactive shipment task processor 17 invokes the planning system 11 through the action of a shipment event planner 14. Within the interactive shipment task processor 17 (FIG. 2), individual modules such as the shipment processing module, engage the shipment event planner through an event processor. The shipment processing module creates an event to be processed. Here, with the shipment identified as ZZZZ, so as to get the shipment routed, the shipment processing module creates as an event: route shipment ZZZZ. An event processor (FIG. 2) then invokes the shipment event planner, which in turn engages the planning engine 22 of the planning system 11. The planning engine 22 then activates its router 23, which extracts from the shipping database 12 any business rules on file for the consignee, and determines a list of candidate routes, each acceptable according to the business rules on file.

In general, the event processor responds not only to individual events, but also to associated subevents. If an event has subevents, the event itself is termed a master event. As an example, a master event can be defined to be "rating a shipment." Subevents can then be defined to be "rating and updating the shipment" and "saving it" (to the shipping database 12), "creating a label" (through the print label module of the interactive shipment task processor 17), and "validating the shipment's fields," i.e. each field of a shipping label, such as the fields indicating the consignee's name and address. The shipping manager 10 includes a set of pre-determined master events to which the seller (shipper) can add subevents. The seller can also add other master events and sub-event for the other master events.

Having routed the shipment and so determined what carriers and services are possible, the seller must next rate the different routes, i.e. determine which to use, assuming that more than one possible route is provided as a candidate route by the router 23 function. For the rating, the seller again uses the interactive shipment task processor 17, and in particular the shipment processing module. The seller inputs to the event processor, as an event to be processed, the rating of the shipment. The event processor then engages the shipment event planner 14, which in turn invokes the planning engine 22 of the planning system 11. The planning engine 22 first uses a rater (module) 24 (FIG. 2), which is part of the planning system, to determine the least expensive of the candidate routes. The rater 24 includes static rater data 24a, such as tariffs for the different services of various carriers, in an associated set of tables accessible only by the rater module 24. It uses the rater data 24a to determine a cost for each candidate route. In the scenario, the rater 24 determines that Alpha Freight Service seven-day service is the least cost route.

In general, though, the router 23 and rater 24 are caused by the planning engine 22 to work in concert to select a carrier based on a range of parameters. Carriers can be pre-selected, based on data passed from the order processing system. Alternatively, selection can be guided or even determined by routing instructions (business rules). Finally, carriers can be selected by a combination of business rules, routing, and rating, as in the scenario.

Another means by which the seller can tailor route selection is to define a group of carriers to be considered in rating a shipment. Then only a carrier in the defined group is rated. Another means is to allow the seller to apply a penalty to any rating for a predetermined carrier so that the selection of the carrier is less likely compared to other carriers, even if the disfavored carrier has a route at a same or better cost compared to the other carriers.

The actions taken by the shipping manager 10 in performing its routing and rating functions, based on what business rules or other guidance have been prescribed, are as indicated in table 1.

As shown in table 1, it is possible to have specific routing instructions, i.e. a specific route (carrier and service), and in such a case, no routing and rating is performed; the specified route is used. Specified routing instructions are provided either by the customer at order entry or as business rules.

Table 1 also shows that it is possible to have shipping instructions (provided by the records with a same route ID) provided by two sources, such as the shipper (the seller in the scenario) and the consignee for a shipment (the customer in the scenario). If these conflict, then the shipping manager uses a route priority table to determine which instructions are to be given precedence. Usually, precedence will be given to the instructions from the entity paying for the shipping charges. Table 1. Rating actions taken by the shipping manager depending on instructions for routing.

| Carrier | Service | Rate Shop Group | Routing Instructions (Route ID) | Both shipper and consignee have routing instructions | Action |
|---------|---------|-----------------|--------------------------------|------------------------------------------------------|--------|
| no | no | no | no | no | Shop all carriers and services in system. |
| no | no | no | no | YES | Use route priority table to determine whose instructions are to be followed. |
| no | no | no | YES | n/a | Use route instructions from ShipHder Route ID. |

-continued

| Carrier | Service | Rate Shop Group | Routing Instruc- tions (Route ID) | Both shipper and consignee have routing instructions | Action |
|---|---|---|---|---|---|
| no | no | YES | n/a | n/a | Shop all carriers in the rate shop group. |
| no | YES | n/a | n/a | n/a | Shop all carriers supporting the service. |
| YES | n/a | n/a | n/a | n/a | Shop all services for the specified carrier. |
| YES | YES | n/a | n/a | n/a | Use specified carrier and service. |

In the scenario, with the shipment routed and rated, the seller can print a label using the print label module of the interactive shipping module 17. The seller can print a carrier label (specific to a particular carrier including mail labels) or a regular shipper label. In addition, the seller can print a billing label, a bill of lading, or a hazardous materials label. Some of the labels can be printed from other interfaces besides those provided by the interactive shipment task processor 17, such as a shipment batch planner 13 and an end-of-day processing module (not shown).

Finally, if the shipment of the scenario were for a foreign country, the seller could create export documentation using the prepare export papers module of an ancillary shipping management processes module 21. For monitoring the shipment in particular, or for monitoring more generally, the shipping manager 10 includes a reporting module as one of the ancillary shipping management processes module 21. The reporting module extracts report data from the shipping database 12.

In the scenario, the seller interactively processed an order using the shipment processing module (FIG. 2) of the interactive shipment task processor 17. The shipping manager 10 also allows batch processing of orders after they are entered into the system by the order entry module 20 or by other means, including electronic downloading from remote order entry locations (not shown). To arrange for batch processing of an order, the seller uses a task scheduler 19 to indicate that shipping for an order is to be planned in batch mode, and then, still using the task scheduler, can prompt a shipment batch planner 13 to batch process any shipments in the shipping database marked for batch processing. (The shipping manager also allows the seller to use the shipment batch planner 13 to initiate the batch processing of any shipments in the shipping database 12 marked for batch processing.)

The shipment batch planner performs the same functions for each shipment in a batch of shipments as the interactive shipment task processor performs for a single shipment, i.e. it performs routing and rating using the planning system 11. However, in batch processing mode, the planning system 11 also iterates in its planning to take advantage of opportunities to consolidate shipments in the batch. The planning engine 22 of the planning system 11 invokes a consolidator (module) 25 (also part of the planning system 11) to attempt to consolidate any or all shipments in the batch of shipments, unless there are instructions not to consolidate. If the consolidator 25 is able to consolidate a shipment with one or more other shipments, the planning engine 22 will then prorate the shipment by invoking a prorater 26, also part of the planning system 11.

In attempting to consolidate shipments, the consolidator 25 searches the batch of shipments for all shipments having matching required properties. Usually these will include the shipper, consignee, and shipment date. However, it is also possible that other properties must match for a consolidation to be possible. For example, it is possible that a carrier is pre-specified. In all, the consolidator 25 can require that the following properties match in order for a consolidation to be acceptable: shipment date, shipper, consignee, bill-to, pre-specified carrier, pre-specified service, charge terms, inbound versus outbound, rate ship group, route ID, required delivery date, and hazardous commodity.

Next the consolidator 25 creates a routing list of carriers-that can handle the shipment. Then it consolidates shipments based on either a least restrictive or a most restrictive bases. In the least restrictive basis, a carrier is selected from the routing list that can meet the earliest required delivery date specified on any shipment in the consolidation. In the most restrictive basis, a carrier is selected from the routing list that can meet the latest required delivery date specified on any shipment in the consolidation.

The task scheduler 19 also allows scheduling any other kind of task performed by the shipping manager 10. Tasks that can be scheduled include: sending and receiving pre-defined electronic data interchange (EDI) transaction sets; emptying database tables; placing shipments in a group with pre-defined selection criteria; packing a group of orders with pre-defined criteria in batch mode; printing bills of lading with pre-defined selection criteria; printing pick tickets with pre-defined selection criteria; printing a pre-defined report; purging a pre-defined group and its loads and shipments; purging shipments and orders based on pre-defined selection criteria; running a batch or executable file synchronously; rating and planning a pre-defined group of shipments; and creating a small package manifest based on pre-defined selection criteria.

Some of these tasks involve updating the shipping database 12 based on information in the host data sources 19, and in particular based on information in host text files (FIG. 2), as one component of the host data sources 19. For these tasks, the task scheduler 19 is used to schedule the data mapper (FIG. 2), of the interface 15 to host data source, to update the shipping database 12 based on information in the host text files. The data mapper then uses map templates (FIG. 2) to determine what data in the host text files maps into what field in the shipping database. The data in the host text files is often in a fixed format; then the map templates indicate (usually in terms of row and column) the beginning of a data item in a host text file, and by a format specification or other means indicate a length of the data item to be mapped.

The interface 15 to host data sources enables a host application and the shipping manager to share various data. The sharing is enabled by dynamic data exchange (DDX) provided by a dynamic data exchanger; by an open data base connectivity (ODBC) exchanger, for exchanging data items maintained in the shipping database and in a host database; and by a data mapper, which acquires data from text files in a host environment and provides data to the host environment as text files. The data mapper is used in particular for acquiring business rules for guidance in routing, possibly expressed using conditional logic.

As explained above, an order can be entered by downloading it from a host system file via the data mapper included as part of the interface 15 to host data sources.

FIG. 2 shows that the dynamic data exchanger module, ODBC exchanger module and rule maker module of the interface 15 to host data source share information via a parameter table (parm table) 16. Other modules also use the parm table 16 to share data. For clarity, the parm table 16 is shown as several different blocks in FIG. 2, although each block represents the same physical parameter table.

The Overall Routing and Rating Process

Still referring to FIG. 2, in planning for the shipping of a parcel, the planning engine 22 first builds a load list template (a load list with some elements, such as costs, still to be determined), performs the planning for the load list template and so determines an actual load list, and provides the results of the planning either to a calling module (either the shipment event planner 14 or the shipment batch planner 13) or to the shipping database 12.

As used here, a load list is a list of loads, each load including one or more shipments (parcels), and each shipment including one or more items included in a shipment, along with associated information, as described below. A load list can be built up from information in the shipping database 12, given a so-called Group identifier (ID), i.e. an index (key) indicating a group of items to be included in a shipment. Such an index would be provided by the shipment batch planner 13 either in response to being scheduled to perform planning for a batch of parcels, or in response to a user commanding the planning of a batch of parcels using the user interface provided as part of the shipment batch planner 13. Alternatively, in case of interactive one-at-a-time parcel shipping planning, a load list can be built up using shipment properties provided by shipment processing (of the interactive shipment task processor 17) via the shipment event planner 14.

Still referring to FIG. 2, as mentioned above, the planning engine calls one or another of various utility modules in performing shipment planning. After building the load list, the planning engine must determine, for each load of the load list in turn, a carrier list (carriers and services) each of which would satisfy any existing requirements for shipping the load. To do so, the planning engine may or may not call the router 23, depending on whether a particular carrier and service has been specified to be used for shipping the load. Assuming not, i.e. assuming that a load is to be shipped based on considering various possible routes (each route being a carrier and service), the planning engine 22 calls the router 23, passing it the load list. The router returns a carrier list (including services) each of which would satisfy any existing routing requirements. Next, the planning engine calls the rater 24, passing it the carrier list determined by the router. The rater then determines a rate for each possible route indicated on the carrier list, and provides the planning engine rating results indicating a rate for each route. (As indicated above, in determining the rates, the rater module uses an associated data file, called rater data 24a.)

Figure 3:
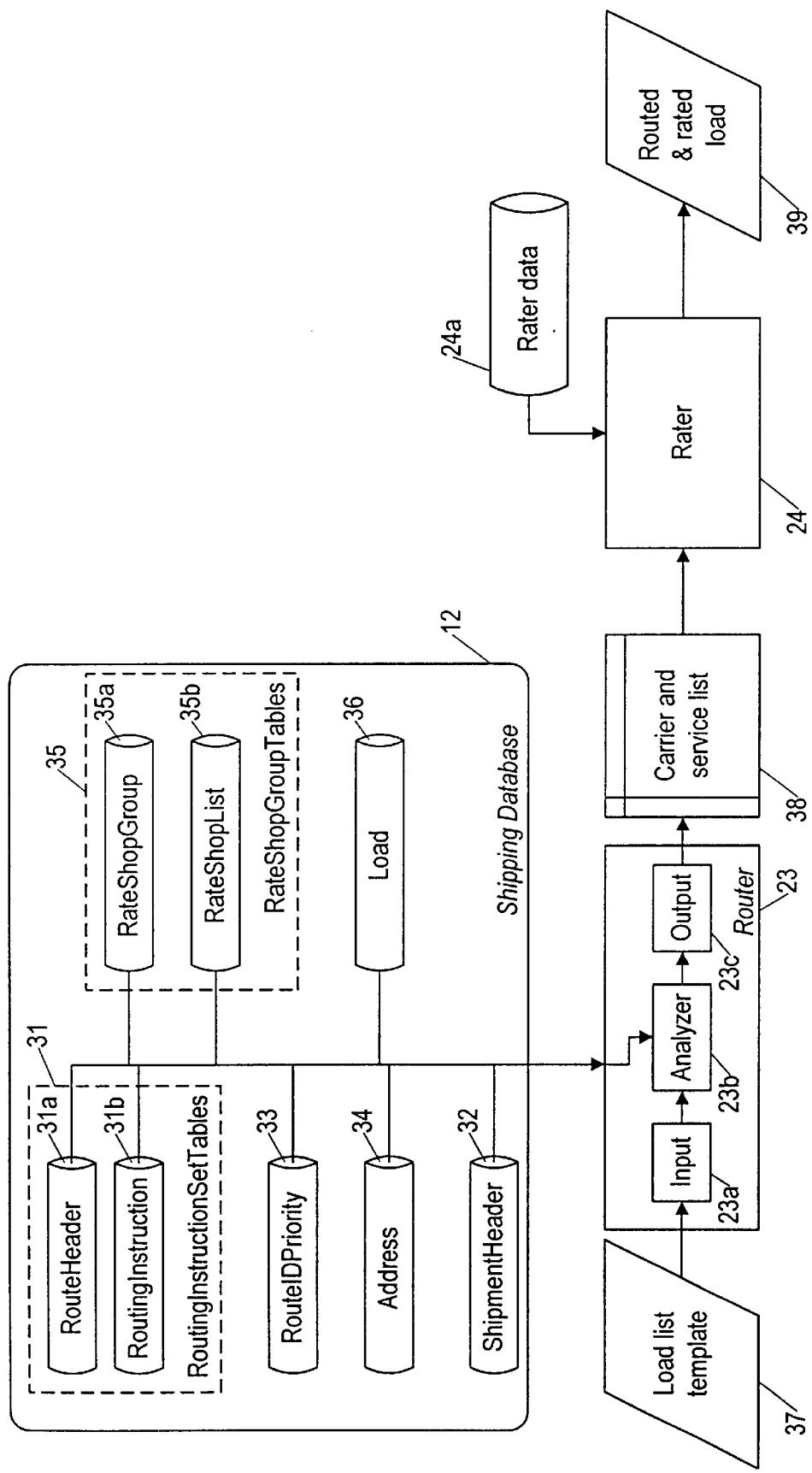
FIG. 3 is a flow chart/block diagram of the overall routing and rating process showing the routing of the present invention.

Referring now to FIG. 3, a flow chart/data flow diagram of the overall routing and rating process is shown, assuming a particular carrier and service have not been specified for a load, as consisting of: first, the routing process performed by the router 23, accepting as an input (from the planning engine 22) a load (data item) 37 from a load list template, and providing as output (to the planning engine) a carrier and service list 38 for the load; and second, the rating process performed by the rater 24, accepting as input (from the planning engine) the carrier and service list 38, and providing as output (to the planning engine) a routed and rated load 39. In performing the routing of a load, the router 23 uses information in the shipping database 12; and in performing the rating of the load, the rater 24 uses information from the rater data 24a.

The router 23 includes: an input module 23a, responsive to the load information from the load list template for the load being routed, for providing a load identifier for the load being planned; an analyzer module, responsive to the load identifier, and further responsive to planning information from the shipping database, as described below, for providing a carrier and service list; and an output module, responsive to the carrier and service list, for communicating the carrier and service list for use by the rater 24.

The overall routing and rating process continues until each load in the load list template is routed and rated. For purposes of routing and rating according to the present invention, it makes no difference whether the load being routed and rated is a direct load (one shipment/parcel) or a consolidation (multiple shipments/parcels).

The Router Utility

As mentioned above, the router 23 is not called to determine a carrier and service list 38 for a load if a carrier and service are pre-specified for the load. Assuming that the router 23 is called, there are different levels of analysis that it will perform, depending again on what is pre-specified. Still referring to FIG. 3, based on the load identifier provided (in the load list template) for the load being routed, the router 23 will refer to the shipping database 12 to obtain the record for the load from a load table 36.

Figure 4:
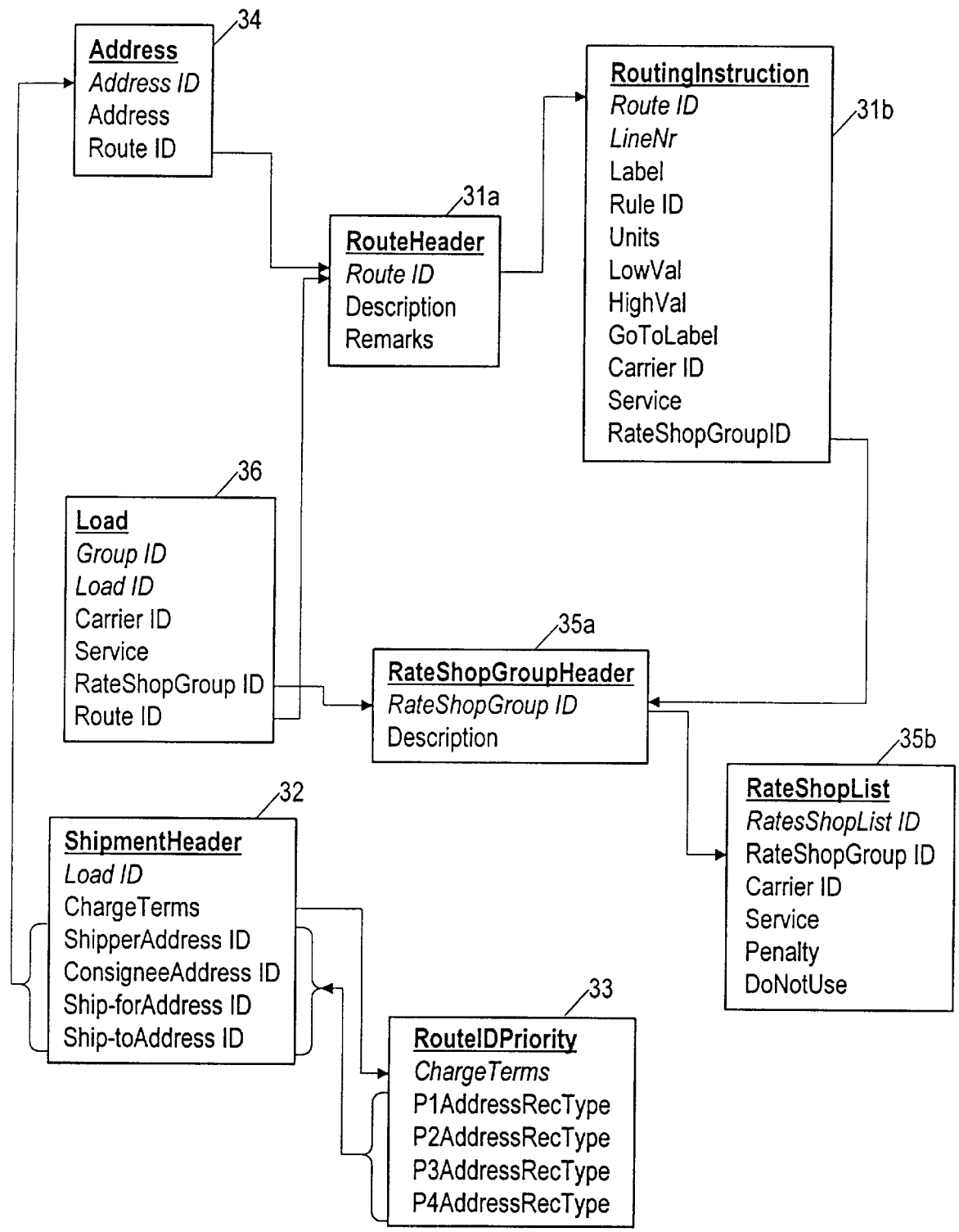
FIG. 4 is a table relationship diagram showing the various tables used by the router, and how records in various of the tables are related.

Referring now also to FIG. 4, a record from the load table 36 has a field for indicating to the router 23 a particular set of routing instructions to be used (identified by a route identifier, which could aptly be called a routing instruction set identifier), and also fields for indicating a particular route (carrier and service), and a field (rate shop group identifier) for indicating a particular set of routes to be shopped. If the load table record (from the load table 36) indicates a particular route (carrier and service), then no analysis is performed by the router 23: the carrier and service list the router 23 provides is as indicated in the load table record. If the load table record indicates a rate shop group, then again, no analysis is performed; the carrier and service list 38 is simply constructed, as described in more detail below, based on records in the rate shop tables 35 (and in particular based on records in the rate shop list table 35b), using the rate shop group identifier indicated in the load table record. In the most general case, though, the router 23 will refer to the routing instruction set tables 31 to determine a carrier and service list 38.

Before the router 23 can begin its most general analysis, however, it must determine a route identifier to use for the load be planned, i.e. it must determine an identifier of which instruction set to use in determining the set of routes (and possible associated penalties) to provide as the carrier and service list 38. Still referring to FIG. 4, there are two tables that can guide the router 23 in determining a route identifier, i.e. there are two tables that associate a route identifier with a load: the load table 36 and the address table 34. If the load table 36 specifies a route identifier, then the router 36 will use the route identifier.

However, in the more general situation, the load table 36 will not specify a route identifier, and the router will then resort to the route identifier priority table 33 to determine a route identifier from the address table 34, as follows. Still referring to FIG. 4, the load identifier in the load table 36 is used by the router 23 as an index into a shipment header table 32, which indicates charge terms for the shipments of a load. In turn, the value of the field in the shipment header table 32 indicating charge terms is used as an index into the route identifier priority table 33, which sets out the priority to be given to route identifiers on file for shippers, consignees, ship-for entities, and ship-to entities. In the preferred embodiment, the charge terms are one of the following: prepaid (PPD), PPA, collect (COL), and third party (3RD), (Thus, there are only four records in this table, each having only five fields, the charge terms field, and four address record types, the first being the priority one address record type, and so on; each record type is one of the following: shipper, consignee, ship-for, or ship-to.)

Based on the charge terms indicated in the shipment header record of the shipment header table 32, the router 23 obtains from the route identifier priority table 33 the priority one address record type, e.g. consignee. It then refers back to the shipment header record to find the address identifier for the priority one address record type. Thus, if the priority one address record type is consignee, then the router 23 will get the consignee address identifier from the shipment header record and use it as an index into the address table 34. If the record selected from the address table indicates a route identifier, the router 23 will use that route identifier. If not, the router will continue on to the priority two address record type, and so on.

If no route identifier results from this process using the route identifier priority table (or if there are no routing instructions for the route identifier that results from this process), then the router 23 will provide as the carrier and service list 38 all carriers and services on file in the shipping database 12.

Example of a Rate Shop Group

Referring now to FIG. 5, a data entry screen for entering or displaying records in the rate shop group tables 35 is shown as including a record 52 from the rate shop group header table 35a and two records 53 from the rate shop list table 35b. Here the rate shop group identifier is LTLLESSRDWY, indicating "less than truckload" (LTL) excluding a carrier identified by carrier identifier RDWY. Correspondingly the description is, "LTL carriers excluding RDWY." The first two records of the rate shop list table 35b corresponding to the rate shop group identified LTLLESS-RDWY are: (first) a record with no carrier identifier indicated and only a service LTL indicated; and (second) a record with a carrier RDWY indicated and the same service LTL indicated, but also a check mark in the field DoNotUse. Thus, the router 23 will interpret these two records in combination to express that all LTL carriers except RDWY are to be rate shopped by the rater 24. It is possible also that another carrier could be indicated and a penalty associated with the carrier, in which case the router 23 would append the penalty and the planning engine 22 would be less likely to select the penalty-bearing carrier.

Having the router interpret a series of records in the rate shop list table corresponding to a same rate shop group identifier allows the use of set logic in indicating a rate shop group, i.e. in particular the use of and-logic to indicate that intersections of one or more sets of carriers and services are to be constructed to determine a rate shop group.

Example of a Set of Routing Instructions

Referring now to FIG. 6, a screen for entry of records into the routing instruction set tables 31 is shown including a record 62 from the route header table 31a and six records 63 from the routing instruction table 31b. Each field of a record of the routing instruction table 31b can be categorized as either a condition field, a go-to label field, a carrier/service field, or a rate shop group field. Thus, the fields of the various records from the routing instruction table 31b shown in FIG. 6 are shown partitioned into fields that are condition fields 64, or a go-to label field 65, or a carrier/service field 66, or a rate shop group field 67. One field, a line number field, is automatically assigned; it is considered part of the condition field partition. Each of the fields in the routing instruction table 31b corresponding to a given route identifier are evaluated by the router 23 to determine one or another rate shop group or particular carrier, service, or carrier and service to include in the carrier and service list 38.

In the example shown in FIG. 6, beginning at line #1, which is the first record of the group of records associated with the route identifier KMART, if the shipment is between 1 and 100 lbs., and the service is GRD, then the router 23 will assign the rate shop identified by rate shop identifier GRDPKG. Thus, the router would refer to the rate shop group tables and select one or more carriers and services depending on the records corresponding to this rate shop group identifier. Going to line #2 of the instructions made up of the records corresponding to the route identifier KMART, if the shipment is between 1 and 100 lbs. and the service is not GRD, then the router will assign the carrier UPS and the service 1A. Going on to line #3, if the shipment is greater than 100 lbs., and the destination is in the Chicago area, then the router will assign the carrier RDWY, and the service LTL. Going to line #4, if the shipment is greater than 100 lbs., and the destination is not in the Chicago area, then the router will assign the rate shop group identified by the rate shop group identifier LTLLESSRDWY. Thus, based on the example indicated by FIG. 5, the carriers assigned would be all LTL carriers except RDWY.

Example of a Route Priority Table

Referring now to FIG. 7, a route identifier priority table 71 is shown in its entirety as consisting of four records, each record including a charge term and four priority address types, each address type being either one or the other of only four possibilities: shipper, consignee, ship-for (third party), and ship-to, as described above.

Summary of the Routing Process

Figure 8:
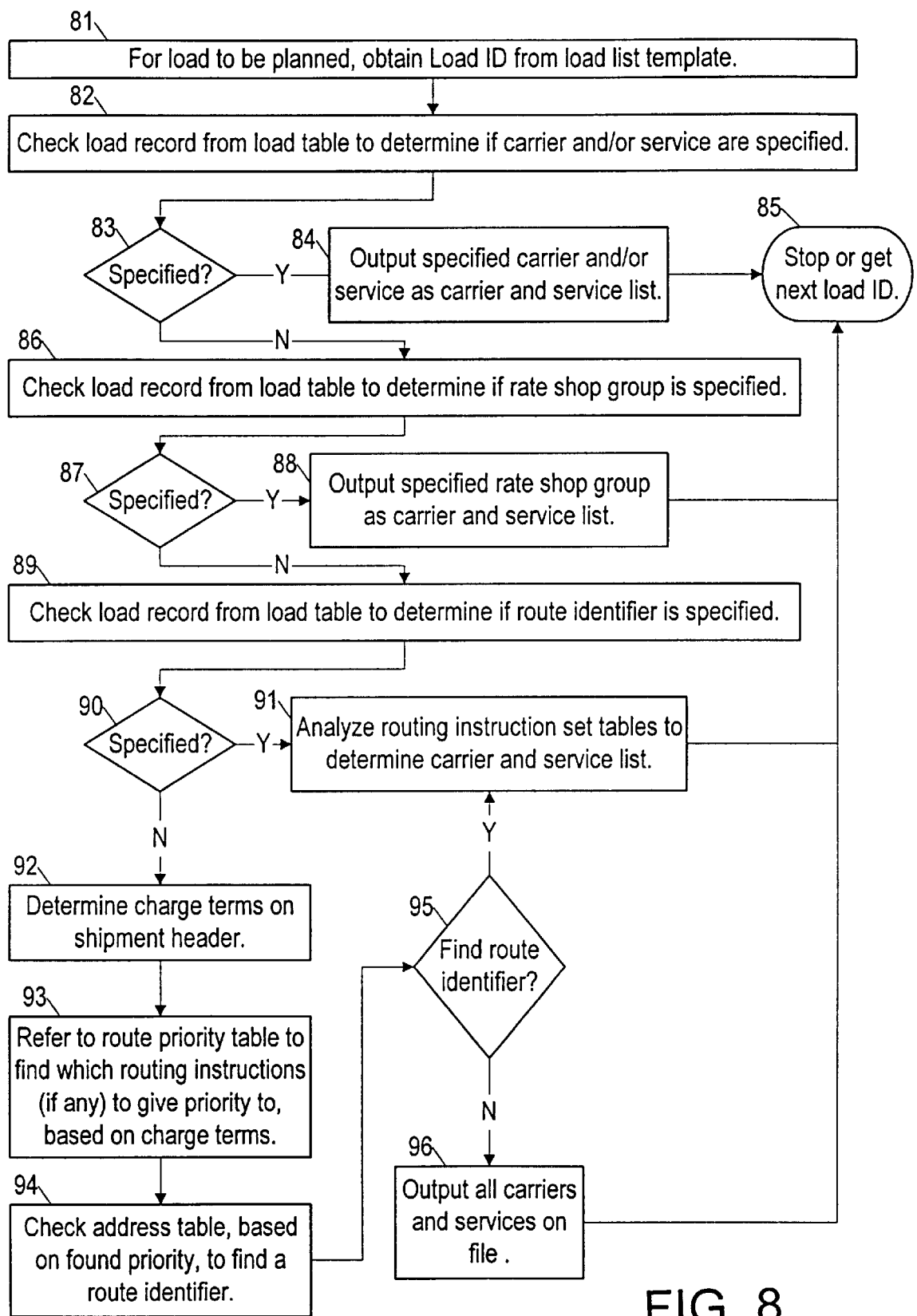
FIG. 8 is a flowchart of a method of routing according to the present invention.

Referring now to FIG. 8, a flowchart for the routing process of the present invention is shown including all levels of analysis, from determining the carrier and service list 38 based simply on the load record (from the load table 36) for the load being planned, to the full analysis based on instructions in the routing instruction set tables 35.

In a first step 81, the load identifier for the load to be routed is obtained from the load list template. In the next step 82, the load record from the load table corresponding to the load identifier is checked to determine if a carrier and/or a service is specified. In a decision step 83, if a carrier and/or service are specified, then in a next step 84, the carrier and/or service are provided as the carrier and service list. Then, in a next step 85, either the next load in the load list template is examined or (if the load just examined is the last load) the routing process is complete.

In decision step 83, if a carrier and/or service are not indicated, then in a next step 86, the load record from the load table is again checked, this time to determine if a rate shop group is specified. In a next step 87, if a rate shop group is specified, then in a next step 88 the corresponding group of routes (carriers and services) is provided as the carrier and service list 38. If not, then in a next step 89, the load record is once again checked to determine if a route identifier is specified. In a next decision step 90, if a route identifier is specified then in a next step 91, the routing instruction set tables 31 are analyzed, based on the route identifier, to determine the carrier and service list 38. If not, then in a next step 92, the shipment header is examined to determine what charge terms are to be used for the shipment. Then in the step 93, the route priority tables are referred to in order to determine whether to give priority to any routing instructions that might be on file for either a shipper, consignee, a ship-for entity, or a ship-to entity. Then in a next step 94, the address table is checked for a route identifier, based on the priority found using the route priority table. In a next decision step 95, if a route identifier is found in the address table, the routing instruction set tables 31 are examined using the same process that would perform the step 91 of analyzing the routing instruction set tables. The process of checking the address table is repeated for each entity (consignee, shipper, and so on), in the order indicated in the route priority table, until a route identifier is determined or all possibilities are exhausted. If no route identifier is determined in this way, then in a next step 96, all carriers and services on file in the shipping database 12 are output as the carrier and service list 38.

SCOPE OF THE INVENTION

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A router for routing a load of one or more shipments of parcels, the router for use in a system for managing shipping parcels, the system including a shipping database and a planning engine that provides load information for the load indicating a load identifier, the router comprising:
   a) an input module, responsive to the load information, for providing the load identifier included in the load information; and
   b) an analyzer, responsive to the load identifier, and further responsive to planning information from the shipping database, for providing a carrier and service list; wherein the planning information from the shipping database is organized as a set of tables of records, each record including one or more fields, and each record using at least one field as an index, the set comprising the following tables:
      i) an address table, for indicating an address and a route identifier based on an address identifier;
      ii) a shipment header table, for indicating charge terms corresponding to a load identifier, and for indicating at least one address identifier;
      iii) rate shop group tables, for indicating one or more routes, each route including a carrier and service;
      iv) a route identifier priority table, for indicating priority for determining a route identifier based on charge terms; and
      v) routing instruction set tables, for indicating instructions for determining a route identifier or a rate shop group, based on a route identifier.

2. A router as in claim 1, wherein the routing instruction set tables include a table of records with the following fields:
   a) condition fields, for indicating a condition;
   b) a label field, for indicating a label identifying another record in the table;
   c) carrier/service fields, for indicating as a routing instruction a carrier, a service, or a carrier and a service; and
   d) a rate shop group field, for indicating as a routing instruction a rate shop group identifier;
   wherein the router applies a particular routing instruction based on whether one or more conditions corresponding to the routing instruction are true, the correspondence being made either through a label field or by including the routing instruction in a record including one of the one or more conditions.

3. A router as in claim 2, wherein the rate shop group tables include a rate shop list table having one or more records corresponding to a same rate shop group identifier, and wherein the router interprets all of the records corresponding to the same rate shop group identifier in combination, thereby enabling the use of set logic in indicating a group of carriers and services to rate shop.

4. A method for routing a load of one or more shipments of parcels, the method for use in a system for managing shipping parcels, the system including a shipping database and a planning engine that provides load information for the load indicating a load identifier, the method comprising the steps of:
   a) obtaining the load identifier from the load information;
   b) obtaining planning information from the shipping database based on the load identifier; and
   c) providing a carrier and service list based on the planning information;
   wherein the planning information from the shipping database is organized as a set of tables of records, each record including one or more fields, and each record using at least one field as an index, the set comprising the following tables:
      i) an address table, for indicating an address and a route identifier based on an address identifier;
      ii) a shipment header table, for indicating charge terms corresponding to a load identifier, and for indicating at least one address identifier;
      iii) rate shop group tables, for indicating one or more routes, each route including a carrier and service;
      iv) a route identifier priority table, for indicating priority for determining a route identifier based on charge terms; and
      v) routing instruction set tables, for indicating instructions for determining a route or a rate shop group, based on a route identifier.

5. A method as in claim 4, wherein the routing instruction set tables include a table of records with the following fields:
   a) condition fields, for indicating a condition;
   b) a label field, for indicating a label identifying another record in the table;
   c) carrier/service fields, for indicating as a routing instruction a carrier, a service, or a carrier and a service; and
   d) a rate shop group field, for indicating as a routing instruction a rate shop group identifier;
   wherein the router applies a particular routing instruction based on whether one or more conditions corresponding to the routing instruction are true, the correspondence being made either through a label field or by including the routing instruction in a record including one of the one or more conditions.

6. A method as in claim 5, wherein the rate shop group tables include a rate shop list table having one or more records corresponding to a same rate shop group identifier, and wherein the router interprets all of the records corresponding to the same rate shop group identifier in combination, thereby enabling the use of set logic in indicating a group of carriers and services to rate shop.

7. A method as in claim 6, wherein the steps of obtaining planning information and providing a carrier and service list include the steps of:

a) obtaining the load identifier from the load information;

b) checking the load record corresponding to the load identifier from the load table to determine if the carrier or service are specified, and if so then providing the specified carrier or service as the carrier service list;

c) checking the load record to determine if a rate shop group is specified and if so providing as the carrier service list the carriers and services indicated by the specified rate shop group;

d) checking the load record from the load table to determine if a route identifier is specified, and if so analyzing the routing instruction set tables based on the specified route identifier to determine a carrier or service or a rate shop group and providing as the carrier list the so-determined carrier or service or rate shop group; and e) checking the charge terms of the shipment header and referring to the route priority table to determine what entity to give priority in using a route identifier, and checking the address table based on the priority indicated in the route priority table for a route identifier, and if a router identifier is thereby determined, then analyzing the routing instruction table based on the so-determined route identifier and providing a carrier service list based on the analysis.

* * * * *